(12) United States Patent
Kawasaki

(10) Patent No.: US 8,982,418 B2
(45) Date of Patent: Mar. 17, 2015

(54) PRINTING SYSTEM, A PRINTING METHOD, AND A COMPUTER PROGRAM FOR PERFORMING COLOR CONVERSION ON A PRINT OBJECT

(71) Applicant: KYOCERA Document Solutions Inc., Osaka (JP)

(72) Inventor: Tomohiro Kawasaki, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/948,324

(22) Filed: Jul. 23, 2013

(65) Prior Publication Data

US 2014/0029059 A1    Jan. 30, 2014

(30) Foreign Application Priority Data

Jul. 27, 2012 (JP) .................... 2012-167822

(51) Int. Cl.
| | |
|---|---|
| H04N 1/40 | (2006.01) |
| H04N 1/60 | (2006.01) |
| G03G 15/00 | (2006.01) |
| G06K 15/02 | (2006.01) |
| G06F 3/12 | (2006.01) |
| G06T 11/00 | (2006.01) |

(52) U.S. Cl.
CPC ......... *H04N 1/6058* (2013.01); *G03G 15/5087* (2013.01); *H04N 1/40012* (2013.01); *G06K 15/1848* (2013.01); *G06F 3/1208* (2013.01); *G06F 3/1219* (2013.01); *G06F 3/1244* (2013.01); *G06F 3/1279* (2013.01); *G06T 11/001* (2013.01)
USPC .......................................... 358/3.01; 358/1.9

(58) Field of Classification Search
USPC ................................... 358/3.01, 1.9
See application file for complete search history.

(56) References Cited

U.S. PATENT DOCUMENTS

| | | | |
|---|---|---|---|
| 2006/0072129 A1* | 4/2006 | Herron | 358/1.9 |
| 2006/0232799 A1 | 10/2006 | Nakatani et al. | |
| 2006/0244984 A1 | 11/2006 | Yoshida et al. | |

FOREIGN PATENT DOCUMENTS

| | | |
|---|---|---|
| EP | 1798952 A1 | 6/2007 |
| JP | 09-030040 | 2/1997 |
| JP | 2002-259109 | 9/2002 |
| JP | 2003-087579 | 3/2003 |
| JP | 2006-262276 | 9/2006 |

OTHER PUBLICATIONS

Extended European Search Report and Opinion for App. No. EP 13178042.1, mailed Sep. 18, 2014, 7 pages.

* cited by examiner

*Primary Examiner* — Martin Mushambo
(74) *Attorney, Agent, or Firm* — McDonnell Boehnen Hulbert & Berghoff LLP

(57) ABSTRACT

A printing system includes a host computer with an application and an image forming apparatus. The host computer includes a color space setting unit and print data creating unit. The color space setting unit sets a color space that can create grayscale images. The print data creating unit performs color conversion on a print object created by the application to create print data, the color conversion being appropriate for the color space. The image forming apparatus includes a grayscale image creating unit and printing unit. The grayscale image creating unit performs color conversion on the print object, which is included in the print data, to create a grayscale image, the color conversion being appropriate for the color space of the print object. The printing unit performs printing according to the grayscale image.

17 Claims, 8 Drawing Sheets

BLACK-AND-WHITE PRINTING

COLOR SPECIFICATION IN APPLICATION

- ⦿ COLOR
- ○ GRAYSCALE/SIMPLE BLACK-AND-WHITE

COLOR

TABLE SPECIFICATION

| OBJECT | TABLE |
|---|---|
| TEXT | LINE DRAWING |
| PAINTING | LINE DRAWING |
| LINE | LINE DRAWING |
| PATTERN | LINE DRAWING |
| BITMAP | TEXT AND PHOTO |

☐ GRAY AXIS FIXING

GRAYSCALE/SIMPLE BLACK-AND-WHITE

TABLE SPECIFICATION

| OBJECT | TABLE |
|---|---|
| TEXT | LINE DRAWING |
| PAINTING | LINE DRAWING |
| LINE | LINE DRAWING |
| PATTERN | LINE DRAWING |
| BITMAP | TEXT AND PHOTO |

FIG. 2

COLOR SPECIFICATION IN APPLICATION
(COLOR)

```
%-12345X
@PJL SET LUTTEXT=LINEART
@PJL SET LUTFILL=LINEART
@PJL SET LUTLINE=LINEART
@PJL SET LUTPATTERN=LINEART
@PJL SET LUTBITMAP=DOCUPHOTO
@PJL SET NAXIS_ADJUST=OFF
@PJL ENTER LANGUAGE=POSTSCRIPT
 M%!PS-Adobe-3.0
...
0 0 0 setrgbcolor
0 0 1 setrgbcolor
0 1 0 setrgbcolor
1 0 0 setrgbcolor
...
```

FIG. 3A

COLOR SPECIFICATION IN APPLICATION
(GRAYSCALE/SIMPLE BLACK-AND-WHITE)

```
%-12345X
@PJL SET GRAYLUTTEXT=LINEART
@PJL SET GRAYLUTFILL=LINEART
@PJL SET GRAYLUTLINE=LINEART
@PJL SET GRAYLUTPATTERN=LINEART
@PJL SET GRAYLUTBITMAP=DOCUPHOTO
@PJL ENTER LANGUAGE=POSTSCRIPT
 M%!PS-Adobe-3.0
...
0   setgray
0.1 setgray
0.6 setgray
0.3 setgray
...
```

FIG. 3B

| OBJECT | GRAYSCALE | BLACK-AND-WHITE |
|---|---|---|
| TEXT | BLACK | BLACK |
| SHADOW OF TEXT | GRAYSCALE | |
| PAINTING | GRAYSCALE | WHITE |
| LINE | BLACK | BLACK |
| BITMAP | GRAYSCALE | GRAYSCALE |
| SHADOW OF OBJECT | GRAYSCALE | BLACK |
| PATTERN | GRAYSCALE | WHITE |

PRINTING SYSTEM, A PRINTING METHOD, AND A COMPUTER PROGRAM FOR PERFORMING COLOR CONVERSION ON A PRINT OBJECT

INCORPORATION BY REFERENCE

This application is based upon and claims the benefit of priority from corresponding Japanese Patent Application No. 2012-167822 filed in the Japan Patent Office on Jul. 27, 2012, the entire contents of which are incorporated herein by reference.

BACKGROUND

Unless otherwise indicated herein, the description in this section is not prior art to the claims in this application and is not admitted to be prior art by inclusion in this section.

The present disclosure relates to a printing system that prints application data, and more particularly to a printing system that can provide stability while performing grayscale printing A typical image forming apparatus can print characters, line drawings, photos, and other data created by applications in grayscale or black-and-white.

Some applications of PowerPoint (registered trademark) have a unique function to covert color images to be printed to grayscale images or black-and-white images.

FIG. 7 shows an example of color conversion results, obtained when grayscale printing or simple black-and-white printing is performed, for each of different object types.

On the print setting screen for use by applications, the user, for example, can select a desired printing mode from "color", "grayscale", and "simple black-and-white" to command printing.

If "grayscale" or "simple black-and-white" is selected, prescribed color conversion is performed for each object, as illustrated in FIG. 7.

When an application having a grayscale conversion function (referred to below as the specific application) is used, however, there is no compatibility between process by the application and process by the printer, so a problem described below may occur.

FIGS. 8A to 8C show a problem related to grayscale printing. FIG. 8A illustrates a case in which an application has not performed grayscale conversion but a printer has performed grayscale conversion. Further, FIG. 8B illustrates a case in which the application has performed grayscale conversion and the printer has also performed grayscale conversion. Yet further, FIG. 8C shows a case in which the application has performed grayscale conversion and the printer has performed color process.

Density in the example illustrated in FIG. 8B is different from density in FIG. 8A, in which some objects have undergone grayscale conversion only on the printer side. This is because grayscale has been performed twice in FIG. 8B. In FIG. 8C, since gray axis fixing, by which the original K value is maintained in conformity with line drawings, has been applied to all image data, a similar problem may occur. This type of problem may be solved by a method in which different color conversion methods are used for different objects or a method in which the density is adjusted for each object. However, these methods are complex and take time.

The present disclosure relates to a printing system in which color conversion appropriate for the color space specified in an application is performed. Further, color conversion is performed so the user can obtain desired output results in both black-and-white printing (grayscale printing), which may be carried out when there is color specification in the application and black-and-white printing (grayscale printing) carried out when there is grayscale specification in the application.

SUMMARY

A printing system in the present disclosure includes a host computer in which an application has been installed and an image forming apparatus. The host computer includes a color space setting unit and a print data creating unit. The color space setting unit sets a color space specified in an application that can create grayscale images. The print data creating unit creates print data and performs an image process on a print object created by the application, where the image process is appropriate for the color space set by the color space setting unit. The image forming apparatus includes a grayscale image creating unit and a printing unit. The grayscale image creating unit performs color conversion on the print object, where the print object is included in the print data. Further, the grayscale image creating unit also creates a grayscale image, where the color conversion is appropriate for the color space of the print object. The printing unit prints according to the grayscale image.

A printing method according to an embodiment of the present disclosure is a method of printing a print object created by using an application. The printing method includes setting a color space specified in the application, where setting the color space is operable to create a grayscale image. Further, the printing method includes creating the print data, where creating the print data includes performing an image process on the print object created by the application, where the image process is appropriate for the color space set by the setting. Further, the printing method includes creating the grayscale image, where creating the grayscale image includes performing color conversion on the print object, where the print object is included in the print data, and where the color conversion is appropriate for a color space of the print object. Further, the printing method includes printing according to the grayscale image.

Another printing system in the present disclosure includes a control unit with a central processing unit (CPU), a read-only memory (ROM), and a random access memory (RAM). Further, the system includes a computer program stored on the ROM or the RAM that is executable by the CPU to cause the control unit to perform functions. These function includes setting a color space specified in an application, where setting the color space is operable to create a grayscale image. Further, these functions include creating print data, where creating the print data includes performing an image process on a print object created by the application, and where the image process is appropriate for the color space set by the setting. Yet further, these functions also include creating a grayscale image, where creating the grayscale image includes performing a color conversion on the print object, where the print object is included in the print data, and where the color conversion is appropriate for a color space of the print object. In addition, these functions include printing according to the grayscale image.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

In the accompanying drawings:

FIG. 2 shows a print setting confirmation screen for use by a printer driver in an embodiment of the present disclosure.

FIGS. 3A and 3B show examples of page description language (PDL) data in an embodiment of the present disclosure.

FIG. 7 shows an example of color conversion results for each of different object types.

DETAILED DESCRIPTION

Figure 1:
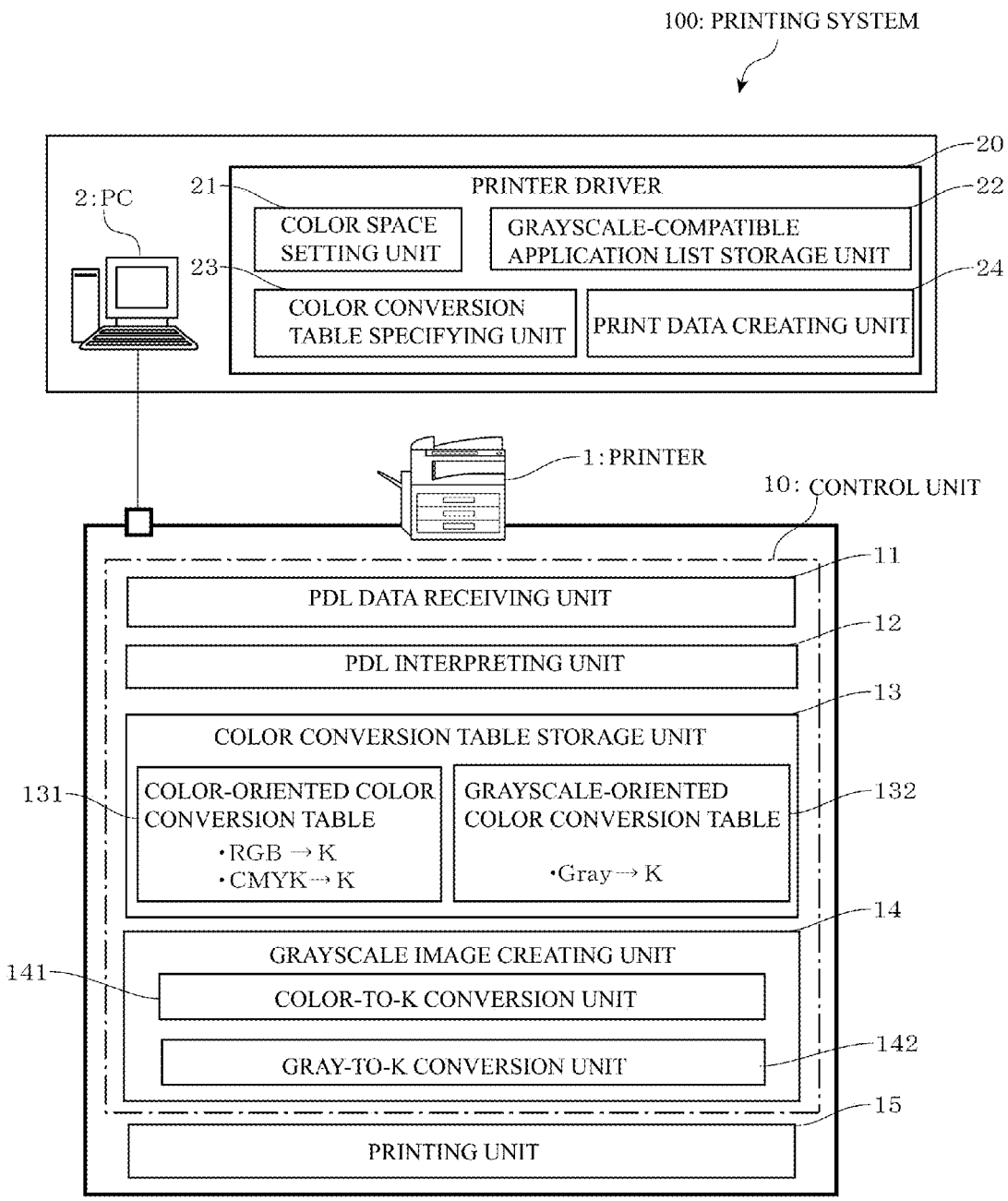
FIG. 1 shows the configuration of a printing system in an embodiment of the present disclosure.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

An embodiment of a printing system in the present disclosure will be described with reference to the drawings.

FIG. 1 shows the configuration of the printing system in this embodiment.

The printing system 100 in this embodiment includes a personal computer 2 (referred to below as the "PC 2") and a printer 1, which are interconnected so that they can mutually communicate. In the PC 2, a printer driver 20 creates PDL data (print data). The printer 1 performs printing according to the PDL data. In this embodiment, the PC 2 and printer 1 are structured so that application data is appropriately created by a specific application to print images in grayscale.

The specific application has been installed in the PC 2 in advance. The PC 2 has a general hardware structure of information processing apparatuses, in which, for example, a central processing unit (CPU), a read-only memory (ROM), a random-access memory (RAM), input units such as a keyboard and a mouse, a display unit, a storage unit such as a hard disk drive, and the like (although these units are not illustrated) are included. The PC 2 also includes a printer driver 20.

In the printer driver 20, the print data creating unit converts the application data created by the specific application to create PDL data. In addition, the printer driver 20 performs operations specific to other functional blocks as described further below.

As illustrated in FIG. 1, the printer driver 20 includes a color space setting unit 21, a grayscale-compatible application list storage unit 22, and a color conversion table specifying unit 23 beside the print data creating unit 24, as functional blocks.

The grayscale-compatible application list storage unit 22 stores applications that have a grayscale conversion function in the form of a grayscale compatible application list. For example, in this embodiment, PowerPoint (registered trademark) and other drawing applications are stored in the grayscale-compatible application list storage unit 22, but simple document creating applications are not stored in the grayscale-compatible application list storage unit 22.

The color space setting unit 21 sets a color space specified in an application. The setting of a color space can be manually carried out. If, for example, the object application is stored as a grayscale-compatible application, it is possible to set a color space automatically by referencing, for example, print settings in the application and identifying a specified color space. If the object application is not included in the grayscale-compatible application list, grayscale conversion is not performed by the application. Therefore, the color space (RGB or CMYK) of application data can be set as the color space specified in the application without alteration.

The color conversion table specifying unit 23 specifies a color conversion table that is used in color conversion performed by the printer 1, according to the color space set by the color space setting unit 21.

The printer 1 stores a grayscale-oriented color conversion table 132 and a color-oriented color conversion table 131. The color conversion table specifying unit 23 specifies, for color values of a print object, the grayscale-oriented color conversion table 132 or color-oriented color conversion table 131 as a color conversion table appropriate for the color space of the print object.

Specifically, if the color space specified in the application is a color space in grayscale, the color conversion table specifying unit 23 specifies the grayscale-oriented color conversion table 132. Further, if the color space specified in the application is a color space in color, the color conversion table specifying unit 23 specifies the color-oriented color conversion table 131.

Furthermore, the color-use color conversion tables 131 and grayscale-oriented color conversion tables 132 are classified into color conversion tables for line drawings and color conversion tables for text and photos (retouched images).

Accordingly, the color conversion table specifying unit 23 not only specifies the grayscale-oriented color conversion table 132 or color-oriented color conversion table 131 as the color conversion table to be used but also makes a specification. For example, the specification is made for each object type and depending on whether the color conversion table to be used is a color conversion table for retouched images or a color conversion table for line drawings.

Further, a print setting operation performed by the printer driver 20 when grayscale printing is performed will be described with reference to the drawings.

FIG. 2 shows a print setting confirmation screen for use by a printer driver. In "Color specification in application" at the top of the screen in FIG. 2, "Color" or "Grayscale/simple black-and-white" is specified as the color space specified in the application.

If "Color" is specified in "Color specification in application", "Table specification" at the middle of the screen in FIG. 2 is applied. If "Table specification" is applied, the color-oriented color conversion table 131 is applied to, for example, text of the print object.

In addition to "Table specification", a "Gray axis fixing" checkbox is displayed at the middle of the screen in FIG. 2. When this checkbox is checked, the black color of the original image can be reproduced with its density maintained.

If "Grayscale/simple black-and-white" is specified in "Color specification in application", "Table specification" at the bottom of the screen in FIG. 2 is applied.

When grayscale printing is performed on application data created by a non-specific application, "Grayscale/simple black-and-white" is grayed and "Color" is specified.

If the color space set by the color space setting unit 21 is in grayscale, the print data creating unit 24 converts the color space (RGB or CMYK) of application data to grayscale (RGB gray) to create PDL data. The print data creating unit 24 includes table information concerning the color conversion table specified by the color conversion table specifying unit 23 in the PDL data.

If the color space specified by the color space setting unit 21 is in color, the print data creating unit 24 creates PDL data according to the original color space (RGB or CMYK) without performing color conversion. The PC 2 transmits the created PDL data to the printer 1.

FIGS. 3A and 3B show examples of PDL data created by the print data creating unit 24. FIG. 3A illustrates an example of PDL data created when "Color" is selected under "Color specification in application". FIG. 3B illustrates an example of PDL data created when "Grayscale/simple black-and-white" is selected under "Color specification in application".

In FIG. 3A, setrgbcolor is written and @PJL SET LUTTEXT=LINEART is also written. This example indicates that as for text, for example, the color-oriented color conversion table 131 for line drawings should be used as the color conversion table.

In FIG. 3B, setgray is written and @PJL SET GRAYLUTBITMAP=DOCUPHOTO is also written. This example indicates that as for bitmaps, for example, the grayscale-oriented color conversion table 132 for documents and photos should be uses as the color conversion table.

As described above, the print data creating unit 24 creates, for each object type, PDL data that includes table information with which a color conversion table to be applied is associated, the color conversion table being a conversion table for line drawings or a conversion table for documents and photos.

If "Gray axis fixing" is checked with "Color" specified under "Color specification in application", the print data creating unit 24 creates PDL data that includes @PJL SET NAXIS_ADJUST=OFF as illustrated in FIG. 3A.

The printer 1 includes a control unit 10, and a printing unit 15 as illustrated in FIG. 1. The control unit 10 mainly performs image process on PDL data received from the PC 2. The printing unit 15 performs printing according to data obtained after image processing.

The control unit 10 includes a computer processing unit (CPU), a read-only memory (ROM), a random access memory (RAM), although, these components are not illustrated. A prescribed computer program is stored in the ROM. When the CPU reads the computer program from the ROM and executes it, the control unit 10 itself operates to implement various functions or the control unit 10 operates other constituent components to implement various functions. The RAM is used as, for example a working memory by the CPU to execute the computer program. The control unit 10 performs ordinary image process to perform printing. The control unit 10 has a unique structure described below to create grayscale images.

The control unit 10 includes a PDL data receiving unit 11, a PDL interpreting unit 12, a color conversion table storage unit 13, and a grayscale image creating unit 14 as functional blocks, as illustrated in FIG. 1. The PDL data receiving unit 11 receives PDL data. The PDL interpreting unit 12 interprets the received PDL data. The color conversion table storage unit 13 stores color conversation tables used to create grayscale images. The grayscale image creating unit 14 creates grayscale images (K images) through color conversion to which a color conversion table is applied.

The PDL data receiving unit 11 receives PDL data from the PC 2 through, for example, a local area network (LAN). The PDL interpreting unit 12 reads the PDL data received from the PC 2 and sequentially interprets print setting commands (PJL commands and other commands), object data to be printed, and the like.

The color conversion table storage unit 13 stores the color-oriented color conversion table 131, which is used to convert color images to optimum grayscale images. Further, the color conversion table storage unit 13 stores the grayscale-oriented color conversion table 132, which is used to convert grayscale images to optimum grayscale images. Specifically, the color-oriented color conversion table 131 stores correspondences between RGB or CMYK color values and K values, and the grayscale-oriented color conversion table 132 stores correspondences between grayscale values and K values.

As described above, the color-use color conversion tables 131 and grayscale-oriented color conversion tables 132 are classified into color conversion tables for line drawings and color conversion tables for documents and photos. In the color conversion table for line drawings, tones suitable for text, lines, and painting are associated. In the color conversion table for documents and photos, tones suitable for retouched images are associated. The "tone" used herein generally indicates the gradation (density) property of a unit color value.

The grayscale image creating unit 14 selects one color conversion table suitable for grayscale image creation from the color conversion tables stored in the color conversion table storage unit 13 and uses the selected color conversion table to perform color conversion on a print object. The grayscale image creating unit 14 includes a color-to-K conversion unit 141 and a gray-to-K conversion unit 142, as illustrated in FIG. 1.

When the color space of the print object is an RGB or CMYK color space, the color-to-K conversion unit 141 uses the color-oriented color conversion table 131 to convert each RGB value or CMYK value to a K value, creating a grayscale image (K image) having a K-value gradation.

When the color space of the print object is a grayscale color space, the gray-to-K conversion unit 142 uses the grayscale-oriented color conversion table 132 to convert each grayscale value to a K value, creating a grayscale image (K image) having a K-value gradation.

In the example illustrated in FIG. 3A, for example, setrgbcolor is written in the PDL data. Therefore, the grayscale image creating unit 14 (color-to-K conversion unit 141) uses the color-oriented color conversion table 131 for line drawings to perform color conversion on objects for which =LINEART is specified and uses the color-oriented color conversion table 131 for documents and photos to perform color conversion on objects for which=DOCUPHOTO is specified.

In the example illustrated in FIG. 3B, setgray is written in the PDL data. Therefore, the grayscale image creating unit 14 (gray-to-K conversion unit 142) uses the grayscale-oriented color conversion table 132 for line drawings to perform color conversion on objects for which=LINEART is specified and uses the grayscale-oriented color conversion table 132 for documents and photos to perform color conversion on objects for which=DOCUPHOTO is specified.

If PDL data that includes @PJL SET NAXIS_ADJUST=OFF is received as illustrated in FIG. 3A, only colored portions other than in black undergo color conversion. Specifically, in this case, the grayscale image creating unit 14 does not perform grayscale process on portions in black in the print object, but reproduces the portions without changing the density of black. Further, the grayscale image creating unit 14 performs grayscale process on colored portions and combines these portions to create a grayscale image. Thus, the problem that the density of lines resulting from grayscale process performed on lines in yellow is lowered and the lines that are thereby difficult to see can be avoided.

The control unit 10 outputs image data obtained after color conversion to the printing unit 15.

The printing unit 15 performs prescribed gamma (γ) correction on the image data and also performs a screening process corresponding to corrected color values to form a dot image. The printing unit 15 then performs the print process on the dot image through various processes including charging, exposure, development, transfer, fixing, and other processes in a electrophotography method. This completes grayscale printing performed for the application data created by the specific application.

With the structure of this printing system 100, the PC 2 specifies the color space specified in the specific application and performs color conversion appropriate for the color space setting on the print object created by the specific application to create the print data. The printer 1 performs, on the print object included in the print data, color conversion appropriate for the color space of the print object. Specifically, the printer 1 uses the color-oriented color conversion table 131 or grayscale-oriented color conversion table 132 to perform color conversion.

Thus, the user can obtain desired output results both in grayscale printing carried out regardless of whether there is a color specification in the application or if there is a grayscale specification in the application.

The user can also obtain desired outputs both when the application data is originally grayscale data and after grayscale conversion has been performed by the application. Furthermore, since the process by the application and the process by the printer do not duplicate each other, grayscale printing can be performed with an appropriate density.

Color conversion tables classified into color conversion tables for line drawings and color conversion tables for documents and photos are used for each object type. Thus, appropriate color conversion can be carried out for each object type. Furthermore, so-called gray axis fixing by which the K value is fixed can be selected. Thus, it is also possible to create grayscale images with the original black density maintained.

Figure 4:
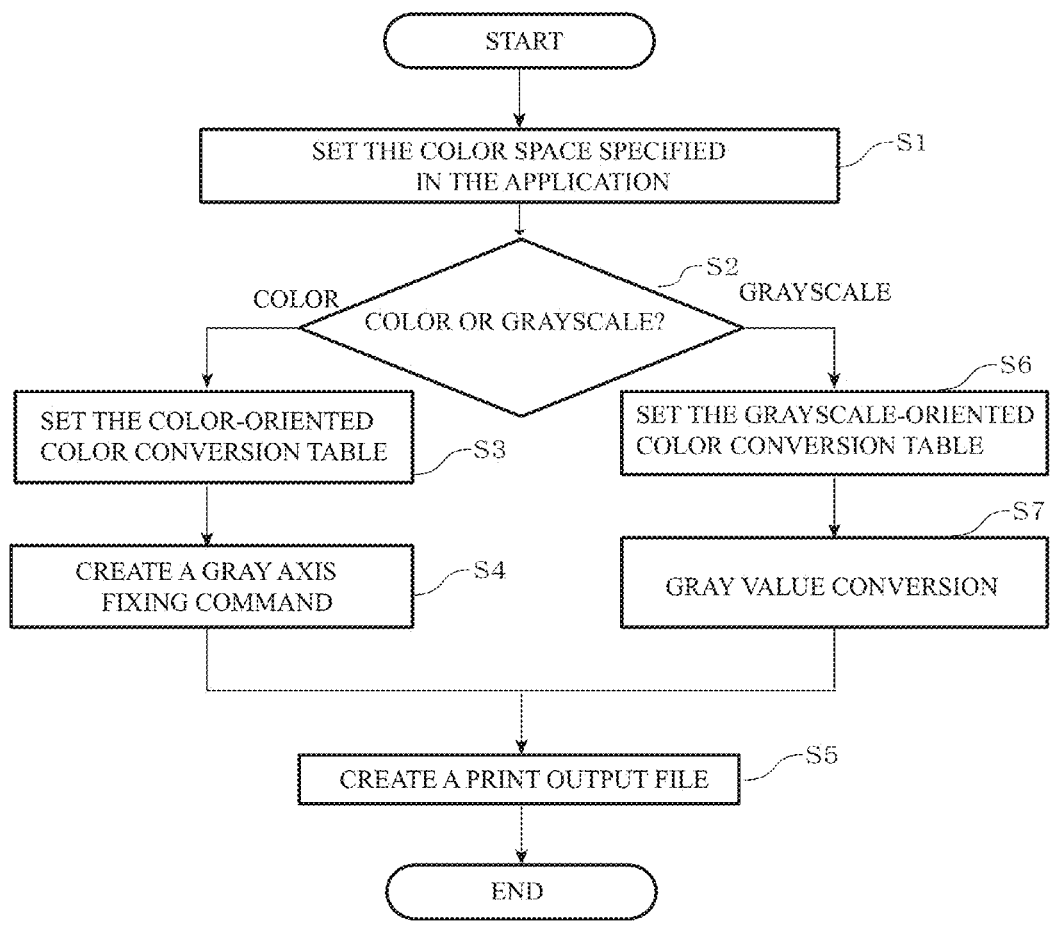
FIG. 4 shows a flowchart illustrating a process executed by a personal computer (PC) in an embodiment of the present disclosure.
Figure 5:
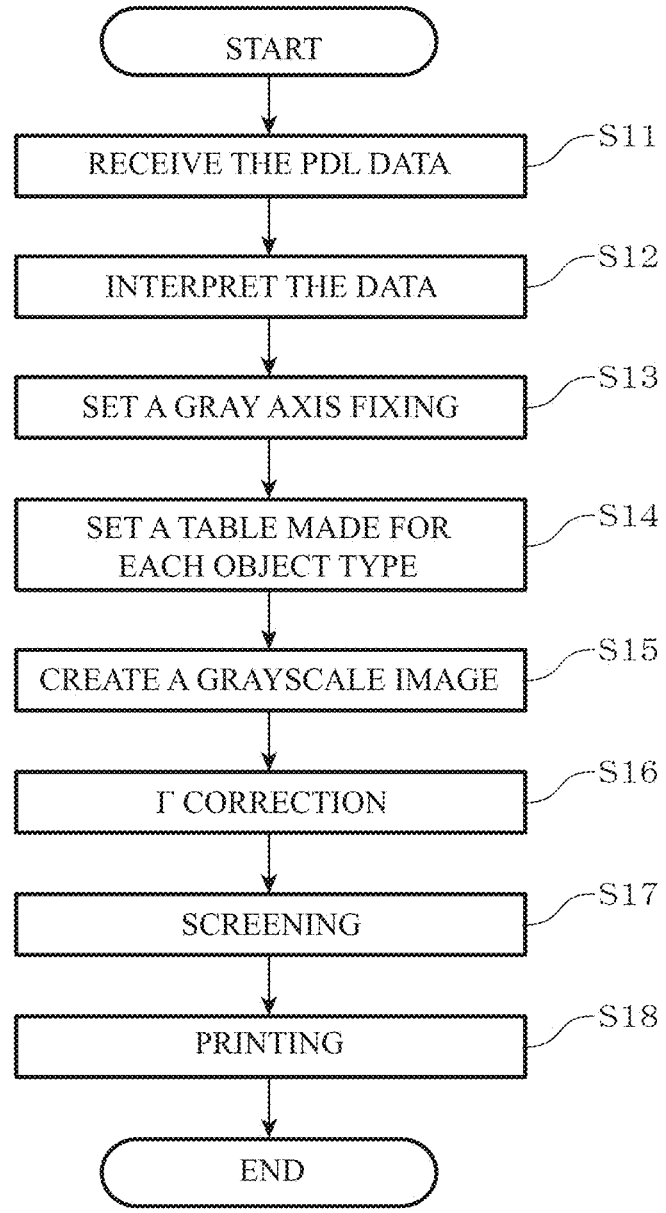
FIG. 5 shows a flowchart illustrating a process executed by a printer in an embodiment of the present disclosure.

Next, the method of printing grayscale images will be described. FIG. 4 shows a flowchart illustrating a process executed by the PC. FIG. 5 shows a flowchart illustrating a process executed by the printer. The PC 2 creates a print output file (PDL data) by following the process illustrated in FIG. 4. The printer 1 creates a grayscale image (K image) and prints it by following the process illustrated in FIG. 5.

As illustrated in FIG. 4, the printer driver 20 first sets the color space specified in the application (S1).

If the color space setting is determined to be a color space in color (S2), the printer driver 20 sets the color-oriented color conversion table 131 (S3). The printer driver 20 then creates a gray axis fixing command (S4). The printer driver 20 then creates a print output file (PDL data) (S5).

If the color space setting made in S1 is determined to be a color space in grayscale (simple black-and-white) (S2), the printer driver 20 sets the grayscale-oriented color conversion table 132 (S6). The printer driver 20 then performs gray value conversion (S7), after which the printer driver 20 creates a print output file (S5). In gray value conversion, RGB color values or CMYK color values are converted into gray values. Specifically, gray values can be calculated by using the above equation (1) (Grayscale=0.3×red+0.6×green+0.1×blue).

In the printer 1, as illustrated in FIG. 5, when the PDL data receiving unit 11 receives the PDL data from the PC 2 (S11), the PDL interpreting unit 12 interprets the data (S12). The control unit 10 identifies a gray axis fixing setting and also identifies a table setting made for each object type. Further, these settings are included in the PDL data (S13, S14). The control unit 10 then creates a grayscale image (K image) (S15).

Figure 6:
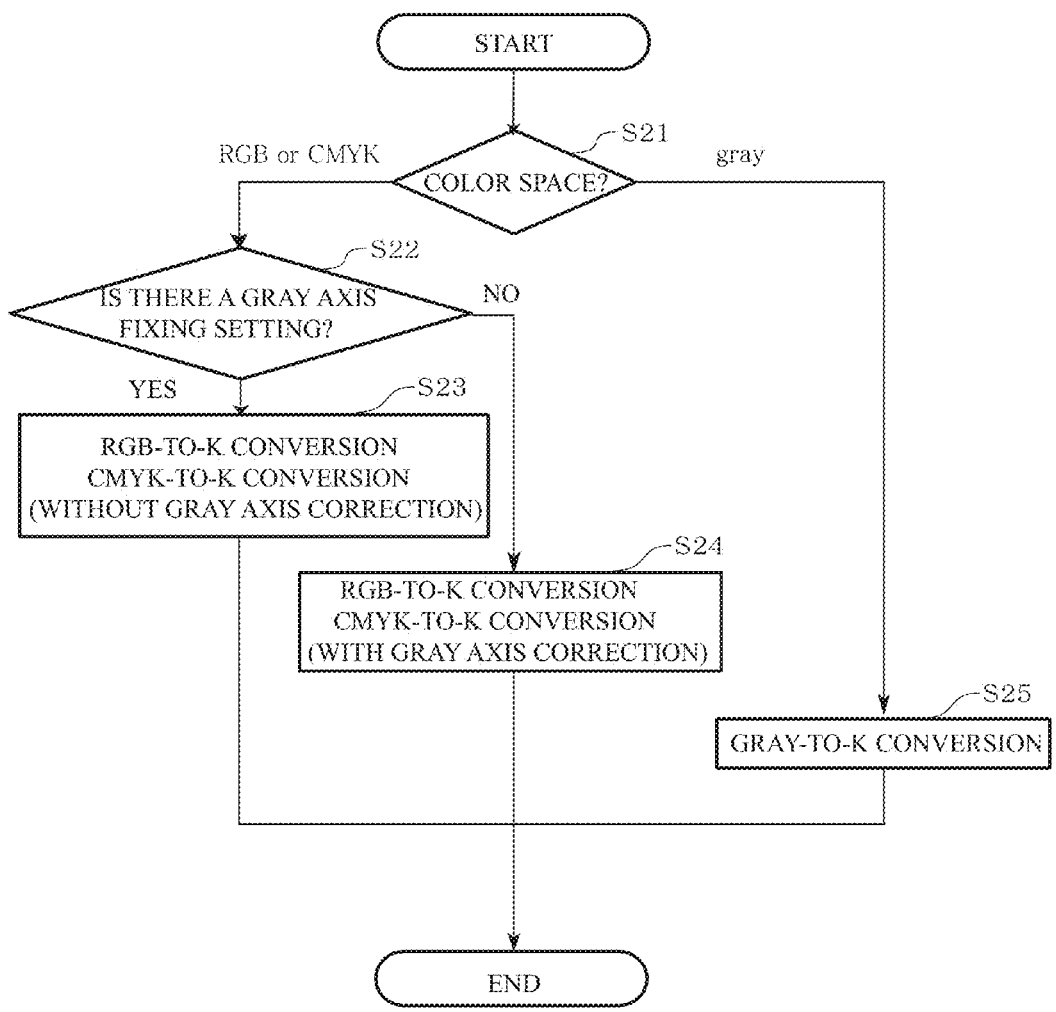
FIG. 6 shows a flowchart illustrating a process for creating a K image in an embodiment of the present disclosure.
Figure 8:
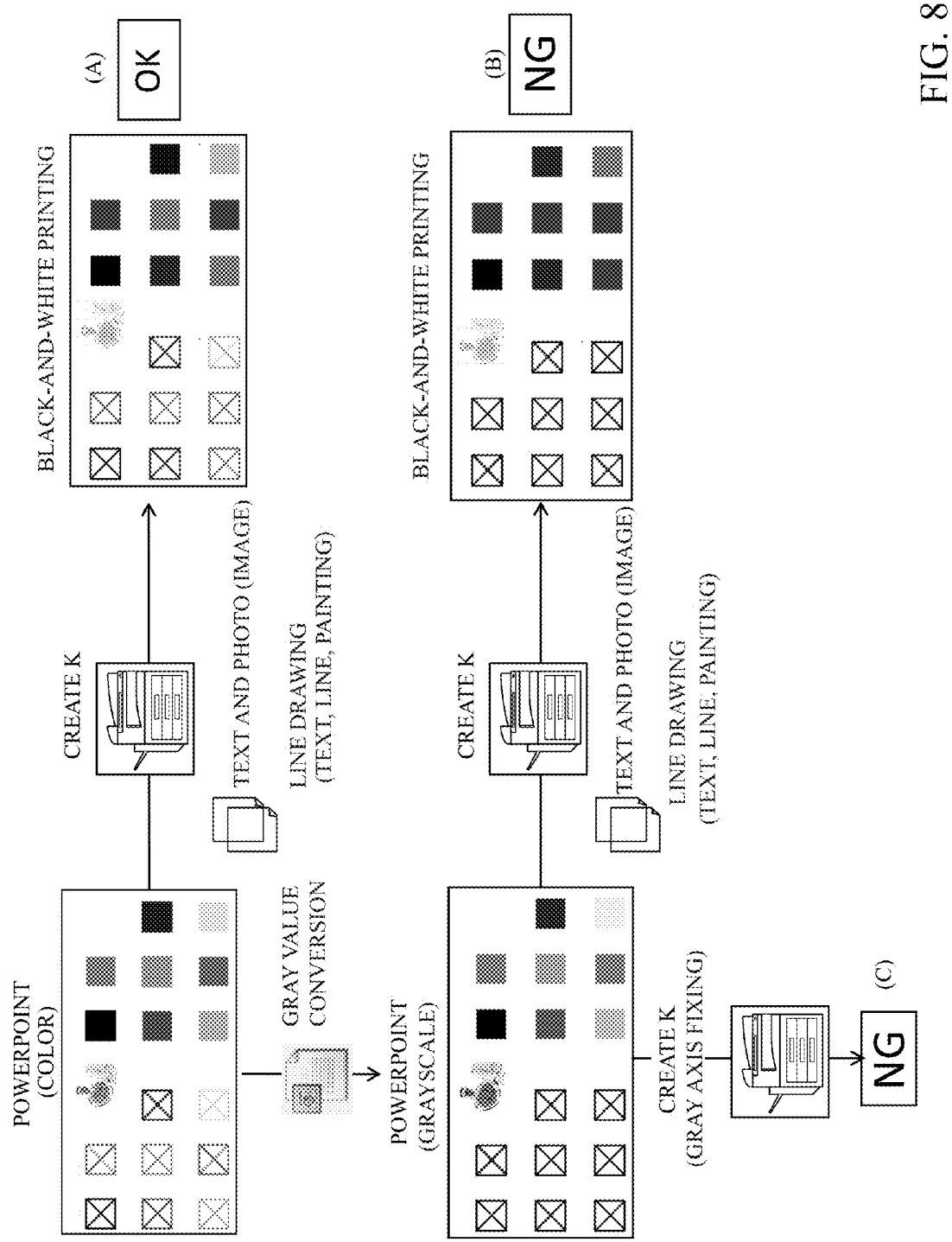
FIGS. 8A to 8C show problems with grayscale printing.

FIG. 6 shows a flowchart illustrating a process for creating a grayscale image.

First, the control unit 10 makes a determination as to a color space eligible for printing (S21). Specifically, the control unit 10 interprets the PDL data to make a determination as to the color space. If the color space is determined to be a color space in RGB or CMYK, the control unit 10 determines whether there is a gray axis fixing setting (S22). Specifically, this determination can be made depending on, for example, whether the "Gray axis fixing" checkbox at the middle of the screen in FIG. 2 has been checked.

If gray axis fixing has been selected, the control unit 10 performs RGB-to-K conversion or CMYK-to-K conversion with the K value fixed (without performing gray axis correction) to create a grayscale image (S23).

If gray axis fixing has not been selected, the control unit 10 performs RGB-to-K conversion or CMYK-to-K conversion without the K value being fixed (by performing gray axis correction) to create a grayscale image (S24).

If the color space is determined to be a color space in grayscale in S21, the control unit 10 performs gray-to-K conversion to create a grayscale image (S25).

After a grayscale image has been created, the printing unit 15 performs γ correction on the grayscale image (S16), performs screening (S17), and performs printing (S18). This completes the printing of the grayscale image.

As described above, in the present disclosure, a printing method in which prescribed processes are combined can also provide the same effect.

As provided above, an embodiment of the printing system 100 in the present disclosure has been described. However, the printing system 100 in the present disclosure is not limited to the embodiment described above. It will be appreciated that various changes and modifications can be made within the scope of the present disclosure. For example, although in the embodiment described above, the printing system 100 that includes the PC 2 and printer 1 has been described as an example, even if the printer 1 is replaced with a monitor, the same effect can be obtained.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses and methods within the scope of the disclosure, in addition to those enumerated herein, will be apparent to those skilled in the art from the foregoing descriptions. Such modifications and variations are intended to fall within the scope of the appended claims. With respect to any or all of the ladder diagrams and flow charts in the drawings and as discussed herein, each block and/or communication may represent a process of information and/or a transmission of information in accordance with example embodiments and alternative embodiments may be included within the scope of such example embodiments. Further, more or fewer blocks and/or functions may be used with any of the ladder diagrams and flow charts discussed herein, and these ladder diagrams and flow charts may be combined with one another, in part or in whole.

The invention claimed is:

1. A printing system comprising a host computer in which an application has been installed and an image forming apparatus, wherein:

the host computer comprises:
a color space setting unit configured to set a color space specified in an application, wherein the color space setting unit is further configured to create a grayscale image, and
a print data creating unit configured to create print data and perform an image process on a print object created by the application, wherein the image process is appropriate for the color space set by the color space setting unit;
the image forming apparatus comprises a grayscale image creating unit configured to:
perform color conversion on the print object, wherein the print object is included in the print data, and
create a grayscale image, wherein the color conversion is appropriate for a color space of the print object,
a printing unit configured to print according to the grayscale image,
a color conversion table storage unit configured to store:
a grayscale-oriented color conversion table in which a correspondence between a grayscale value and a first black value is stored, and
a color-oriented color conversion table in which a correspondence between a color value and a second black value is stored; and
the grayscale image creating unit in the image forming apparatus is further configured to:
perform color conversion on a color value of the print object by using the grayscale-oriented color conversion table or the color-oriented color conversion table as a color conversion table for the color space of the print object to obtain a corresponding black value, and
create a grayscale image according to the corresponding black value.

2. The printing system according to claim 1, wherein:
in the host computer, if the color space specified in the application is a color space in grayscale, the print data creating unit is further configured to perform grayscale conversion on the print object to create the print data; and
in the image forming apparatus, the grayscale image creating unit is further configured to:
perform color conversion on the color value of the print object by using the grayscale-oriented color conversion table to obtain a corresponding black value, and
create a grayscale image according to the corresponding black value.

3. The printing system according to claim 1, wherein:
in the host computer, if the color space specified in the application is a color space in color, the print data creating unit is further configured to create the print data for the print object according to the color space of the print object; and
in the image forming apparatus, the grayscale image creating unit is further configured to:
perform color conversion on the color value of the print object by using the color-oriented color conversion table to obtain a corresponding black value, and
create a grayscale image according to the corresponding black value.

4. The printing system according to claim 1, wherein:
the host computer comprises a black value fixing selection unit, wherein if the color space specified in the application is a color space in color, the black value fixing unit is configured to make a setting as to whether an original black value included in the print object is to be fixed such that selection of the setting is possible;
in the host computer, the print data creating unit is further configured to create the print data that includes selection identification information by which identification of the selection is made possible; and
in the image forming apparatus, if fixing of a black value included in the print object is confirmed according to the selection identification information included in the print data, the grayscale image creating unit is further configured to:
perform color conversion on a color value of a colored portion of the print object by using the color-oriented color conversion table to obtain a corresponding black value, and
create a grayscale image according to the corresponding black value and the original black value.

5. The printing system according to claim 1, wherein:
the grayscale-oriented color conversion table and the color-oriented color conversion table are classified as a color conversion table for a retouched image or a line drawing, wherein if the color conversion table is for the retouched image, a tone for the retouched image is associated for each object type, and wherein if the color conversion table is for the line drawing, a tone for the line drawing is associated for each object type;
in the host computer, the print data creating unit is further configured to create the print data that includes, as a color conversion table to be used for each object type, table information with which the color conversion table for the retouched image or the color conversion table for the line drawing is associated; and
in the image forming apparatus, the grayscale image creating unit is further configured to perform color conversion on a color value of each object in the print object by using the color-oriented color conversion table for the retouched image or the color-oriented color conversion table for the line drawing, which is identified according to the table information included in the print data, to obtain a corresponding black value, and creates a grayscale image according to the corresponding black value.

6. A method of printing a print object that has been created using an application installed in a computer, the method comprising:
setting a color space specified in the application, wherein setting the color space is operable to create a grayscale image;
creating print data, wherein creating the print data comprises performing an image process on the print object created by the application, wherein the image process is appropriate for the color space set by the setting;
creating a grayscale image, wherein creating the grayscale image comprises performing color conversion on the print object, and wherein the print object is included in the print data, and wherein the color conversion is appropriate for a color space of the print object;
printing according to the grayscale image;
storing a grayscale-oriented color conversion table in which a correspondence between a grayscale value and a first black value is stored, and
storing a color-oriented color conversion table in which a correspondence between a color value and a second black value is stored, and wherein
creating the grayscale image comprises obtaining a corresponding black value, wherein the corresponding black value is obtained by performing color conversion on a color value of the print object, and wherein obtaining the corresponding black value comprises using the grayscale-oriented color conversion table or the color-oriented color conversion table as a color conversion table appropriate for the color space of the print object.

7. The method according to claim 6, wherein if the color space specified in the application is a color space in grayscale, creating the print data further comprises performing grayscale conversion on the print object, and wherein creating the grayscale image comprises using the corresponding black value.

8. The method according to claim 6, wherein if the color space specified in the application is a color space in color, creating the print data further comprises creating the print data for the print object according to the color space of the print object, and wherein creating the grayscale image comprises using the corresponding black value.

9. The method according to claim 6, wherein:
if the color space specified in the application is a color space in color, the method further comprises making a setting as to whether an original black value included in the print object is to be fixed such that selection of the setting is possible, wherein
creating the print data comprises including, in the print data, selection identification information by which identification of the selection is made possible; and wherein
if fixing of a black value included in the print object is confirmed according to the selection identification information included in the print data, creating the grayscale image comprises using the corresponding black value and the original black value.

10. The method according to claim 6, wherein:
creating the print data comprises including, in the print data, table information used as a color conversion table for each object type, wherein the color conversion table is used for a retouched image or for a line drawing, and wherein
creating the grayscale image comprises creating the grayscale image according to a corresponding black value, wherein the corresponding black value is obtained by performing color conversion on a color value of each object in the print object, wherein performing the color conversion on the color value comprises using the color-oriented color conversion table for the retouched image or the color-oriented color conversion table for the line drawing; wherein
the color conversion table for the retouched image is a color conversion table with which a tone for the retouched image is associated for each object type, and the color conversion table for the line drawing is a color conversion table with which a tone for a line drawing is associated for each object type, and wherein the grayscale-oriented color conversion table and color-oriented color conversion table are classified as the color conversion table for the retouched image or the color conversion table for the line drawing.

11. The method according to claim 10, wherein the retouched image comprises text or a first set of photos, and wherein the line drawing comprises documents or a second set of photos.

12. A system comprising:
a control unit comprising a central processing unit (CPU), a read-only memory (ROM), and a random access memory (RAM);
a computer program stored on the ROM or the RAM that is executable by the CPU to cause the control unit to perform functions comprising:
setting a color space specified in an application, wherein setting the color space is operable to create a grayscale image;
creating print data, wherein creating the print data comprises performing an image process on a print object created by the application, and wherein the image process is appropriate for the color space set by the setting;
creating a grayscale image, wherein creating the grayscale image comprises performing color conversion on the print object, wherein the print object is included in the print data, and wherein the color conversion is appropriate for a color space of the print object; and
printing according to the grayscale image,
wherein the computer program is executable by the CPU to cause the control unit to perform functions further comprising
storing a grayscale-oriented color conversion table in which a correspondence between a grayscale value and a first black value is stored, and
storing a color-oriented color conversion table in which a correspondence between a color value and a second black value is stored, and wherein
creating the grayscale image comprises obtaining a corresponding black value, wherein the corresponding black value is obtained by performing color conversion on a color value of the print object, and wherein obtaining the corresponding black value comprises using the grayscale-oriented color conversion table or the color-oriented color conversion table as a color conversion table appropriate for the color space of the print object.

13. The system of claim 12, wherein if the color space specified in the application is a color space in grayscale, creating the print data further comprises performing grayscale conversion on the print object, and wherein creating the grayscale image comprises using the corresponding black value.

14. The system of claim 12, wherein if the color space specified in the application is a color space in color, creating the print data further comprises creating the print data for the print object according to the color space of the print object, and wherein creating the grayscale image comprises using the corresponding black value.

15. The system of claim 12, wherein:
if the color space specified in the application is a color space in color, the method further comprises making a setting as to whether an original black value included in the print object is to be fixed such that selection of the setting is possible, wherein
creating the print data comprises including, in the print data, selection identification information by which identification of the selection is made possible; and wherein
if fixing of a black value included in the print object is confirmed according to the selection identification information included in the print data, creating the grayscale image comprises using the corresponding black value and the original black value.

16. The system of claim 12, wherein
creating the print data comprises including, in the print data, table information used as a color conversion table for each object type, wherein the color conversion table is used for a retouched image or for a line drawing, and wherein
creating the grayscale image comprises creating the grayscale image according to a corresponding black value, wherein the corresponding black value is obtained by performing color conversion on a color value of each object in the print object, wherein performing the color conversion on the color value comprises using the color-oriented color conversion table for the retouched image or the color-oriented color conversion table for the line drawing; wherein the color conversion table for the retouched image is a color conversion table with which a tone for the retouched image is associated for each object type, and the color conversion table for the line drawing is a color conversion table with which a tone for a line drawing is associated for each object type, and wherein the grayscale-oriented color conversion table and color-oriented color conversion table are classified as the color conversion table for the retouched image or the color conversion table for the line drawing.

17. The system of claim 16, wherein the retouched image comprises text or a first set of photos, and wherein the line drawing comprises documents or a second set of photos.

\* \* \* \* \*